(12) United States Patent
Kress et al.

(10) Patent No.: US 6,808,342 B2
(45) Date of Patent: Oct. 26, 2004

(54) TOOL

(75) Inventors: Dieter Kress, Aalen (DE); Friedrich Haberle, Lauchheim (DE)

(73) Assignee: Mapal, Fabrik für Präzisionswerkzeuge, Dr. Kress KG, Aalen (DE)

( * ) Notice: Subject to any disclaimer, the term of this patent is extended or adjusted under 35 U.S.C. 154(b) by 0 days.

(21) Appl. No.: 10/172,110

(22) Filed: Jun. 14, 2002

(65) Prior Publication Data

US 2003/0012616 A1 Jan. 16, 2003

(30) Foreign Application Priority Data

Jun. 15, 2001 (DE) .......................................... 101 28 816

(51) Int. Cl.⁷ ..................... B23C 9/00; B23Q 11/10; B23Q 11/12
(52) U.S. Cl. .................. 409/136; 409/234; 408/59; 408/60
(58) Field of Search ................. 409/135–136, 409/234; 408/58, 56–57, 59–61; 407/11; 279/83, 76

(56) References Cited

U.S. PATENT DOCUMENTS

| | | | | |
|---|---|---|---|---|
| 4,133,545 A | * | 1/1979 | Komori | 279/83 |
| 4,647,052 A | * | 3/1987 | Butikofer | 279/83 |
| 4,669,933 A | * | 6/1987 | Dye | 409/136 |
| 5,244,322 A | * | 9/1993 | Schweizer et al. | 409/233 |
| 5,676,506 A | * | 10/1997 | Sugata | 409/136 |
| 5,890,849 A | * | 4/1999 | Cselle | 409/136 |
| 6,123,270 A | * | 9/2000 | Hara | 408/61 |
| 6,270,295 B1 | * | 8/2001 | Hyatt et al. | 408/59 |
| 6,312,199 B1 | * | 11/2001 | Sjoden et al. | 407/11 |
| 6,672,809 B2 | * | 1/2004 | Senzaki | 409/136 |
| 2002/0067965 A1 | * | 6/2002 | Kress et al. | 408/59 |
| 2003/0123940 A1 | * | 7/2003 | Hubbard et al. | 408/61 |

FOREIGN PATENT DOCUMENTS

| | | |
|---|---|---|
| DE | 004208063 A1 * | 9/1993 |
| DE | 197 25 343 A1 | 4/1998 |
| DE | 197 38 832 A1 | 3/1999 |
| DE | 019835677 A1 * | 1/2000 |
| DE | 019917219 A1 * | 10/2000 |
| EP | 0 860 231 A1 | 8/1998 |
| JP | 11-156668 A * | 6/1999 |
| JP | 11-320213 A * | 11/1999 |
| WO | WO 98/48963 | 11/1998 |

* cited by examiner

Primary Examiner—Erica Cadugan
(74) Attorney, Agent, or Firm—Morriss O'Bryant Compagni, P.C.

(57) ABSTRACT

Proposed is a tool with a tool insert (53) for machining workpieces, comprising a collet (2), designed for manual interchange of tools and for securing in position the tool insert (53) in a tool spindle (89), comprising at least one channel, penetrating essentially in the axial direction of the tool (1), in particular the collet (2), for mediums, in the particular for coolants and/or flushing agents and/or lubricants. The tool is characterized in that a second channel (7, 7'), which is separated from a first channel (5) and which runs essentially in the axial direction, is provided for mediums, in particular for coolants and/or flushing agents and/or lubricants in the collet (2), and that different mediums can be conveyed in the channels (5) and (7; 7'); and that they empty into a mixing device (85).

21 Claims, 5 Drawing Sheets

TOOL

BACKGROUND

The invention relates to a tool for machining workpieces which is designed with separate channels to prevent undesired separation of fluid media being conveyed through the tool.

Tools of the class addressed here are known. They are used, among other things, in connection with machine tools, where a tool insert is clamped manually especially by means of a collet and can be changed and where a coolant/lubricant is supplied preferably inside the tool. To pass the coolant/lubricant through, there is a channel, running essentially in the axial direction, inside the tool. These tools are also operated with the MMS technology (minimum quantity lubrication). To this end, a mixture of air and oil is usually conveyed by way of the channel through the tool up to the actual operating site, the cutting edge. This mixture is produced by atomizing and is conveyed through the channel to the actual operating site. It has been demonstrated that in the case of tools of the generic class an undesired separation or sagging of the mixture of oil and air occurs owing to the length of the channel and owing to the change in direction of the channel.

Therefore, the object of the invention is to provide a tool, which is characterized in that especially when the minimum quantity lubrication technology is applied, an undesired separation and a sagging while operating the tool are largely prevented.

To solve this problem a tool is proposed that comprises structural features including a collet that has a second channel, which is separated from a first channel and runs essentially in the axial direction. Different mediums can be conveyed in the channels, which empty into a mixing and vorticizing chamber. This feature has the advantage that the mediums can be conveyed separately through the collet; and consequently the point of origin of a mixture is, seen in the direction of flow, closer to the actual operating site, thus at the cutting edge. A separation or sagging on the short path from the mixing chamber to the actual operating site is almost totally ruled out.

A preferred embodiment of the tool is characterized in that the second channel also continues in the tool insert. Thus, it is guaranteed that the mixture, comprising different mediums, can be produced in close vicinity to the cutting edge; and hence any undesired separation before the mixture becomes effective is ruled out.

Another preferred embodiment of the tool is characterized in that the continuation of the channels by way of the interfaces-the tool holder collet and/or the collet tool insert-is realized by means of centered pins and/or circumferential ring grooves. This feature enables two channels to pass over the interfaces of the tool parts, which can be rotated in relation to each other when they are in the non-fixed state. Other advantages follow from the other dependent claims.

The invention is explained in detail below with reference to the drawings.

DETAILED DESCRIPTION

Figure 1:
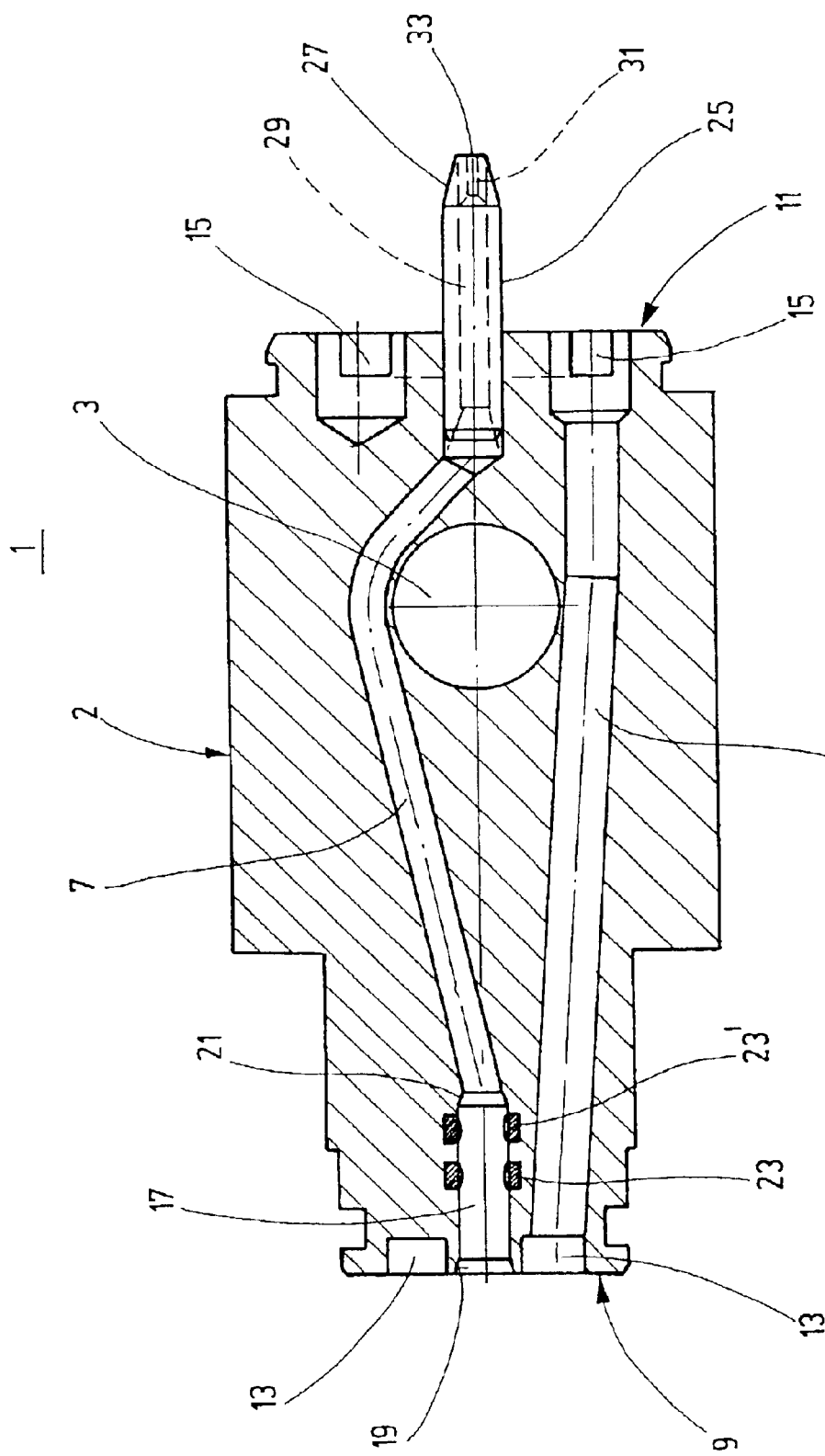
FIG. 1 is a longitudinal view of a part of the tool, namely a collet with two fluid channels.

The tool 1, explained below, comprises a tool insert and a collet 2, which is reproduced in a longitudinal view in FIG. 1. By means of the collet 2 the tool insert can be clamped manually with a tool spindle. The collet 2 exhibits a chucking fixture (not illustrated here) for mounting the tool insert with the tool spindle. It comprises essentially two gripping jaws, which lie in front of or behind the image plane, and a right/left screw, which is guided in a borehole 3, which runs vertically to the image plane. The right/left screw serves to guide the gripping jaws radially toward the inside and outside. The chucking fixture can be manually operated by means of the right/left screw. With an externally oriented movement of the gripping jaws, the tool insert is mounted with the tool spindle.

The collet 2 exhibits a first channel 5 and a second channel 7. The channels 5, 7 run essentially in the axial direction from a first interface area 9 to a second interface area 11 of the collet 2. The second channel 7 exhibits a continuous course, which is optimized from the point of view of flow engineering and which can be produced, for example, by means of a sintering process.

The interface areas 9, 11, which lie on the face side of the collet 2, exhibit a first ring groove 13 and a second ring groove 15, which are recessed into the base body of the collet 2 and serve to convey the fluids over and beyond the interface areas 9, 11. The channel 7 empties into the first interface area 9 in a centered borehole 17, which exhibits a first phase 19 and a second phase 21 and two ring grooves. The phases 19, 21 serve as guides for a phased pin (not illustrated here), which can be inserted into the borehole 17.

The ring grooves serve as receptacles for two sealing elements 23, 23'. The sealing elements 23, 23' are designed preferably as O-rings and serve to seal the channel 7, which is continued by means of the pin (not illustrated here) beyond the interface area 9. In the second interface area 11 the channel 7 empties into a pin 25, which exhibits a phase 27 and a centered borehole 29. The borehole 29 tapers off into a nozzle borehole 31, which terminates in a discharge opening 33. Owing to the nozzle borehole 31 and the discharge opening 33, the pin 25 forms a nozzle, which finely atomizes a fluid, which is under corresponding pressure, when said fluid leaves through the discharge opening 33. The discharge opening 33 empties into a mixing and vorticizing chamber, which is described in detail in FIG. 4.

Figure 2:
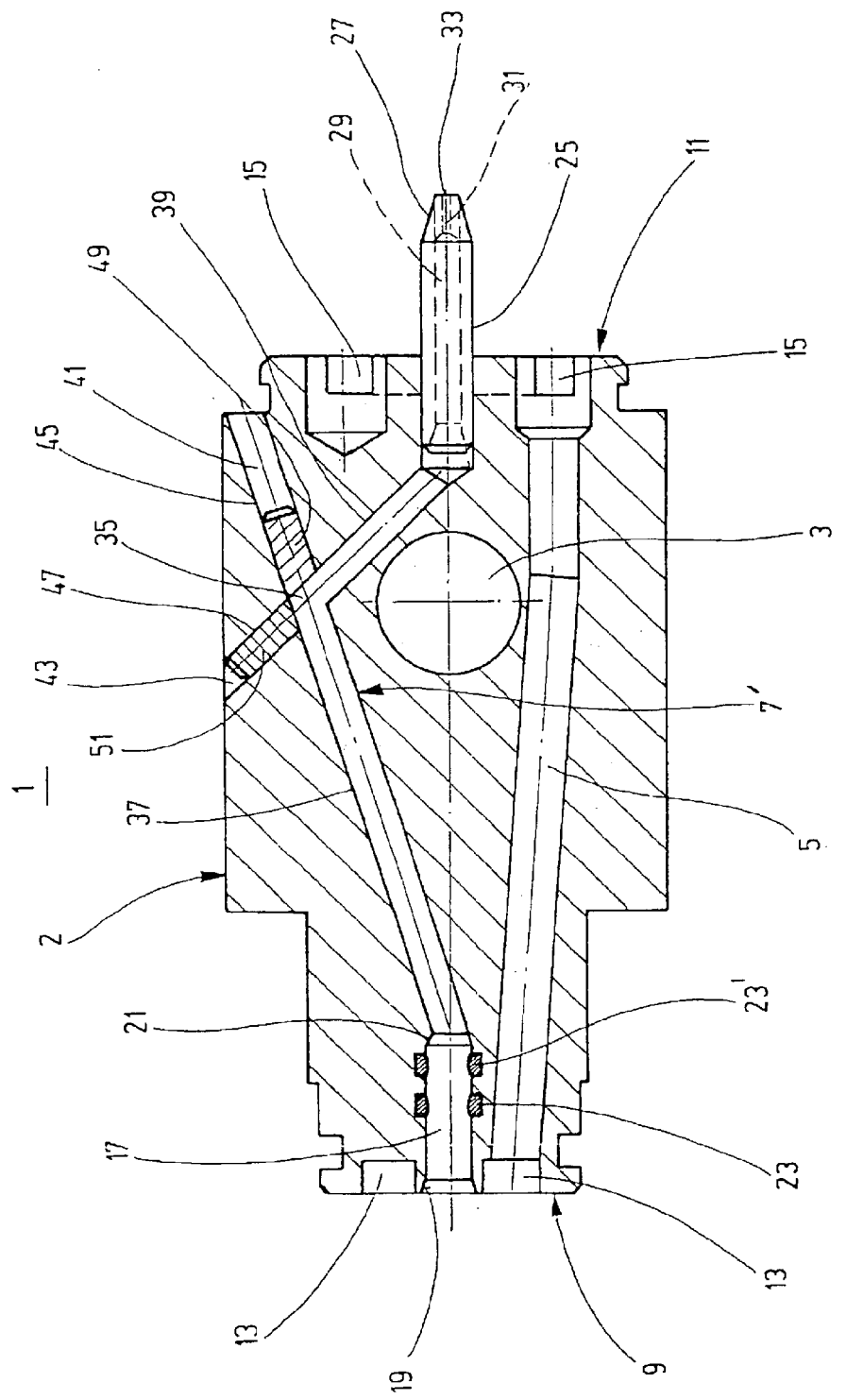
FIG. 2 is a longitudinal view of the collet with a modified channel.

FIG. 2 depicts the collet 2, shown in FIG. 1, with a modified second channel 7'. Identical parts are provided with the same reference numerals so that in this respect reference is made to the description to FIG. 1.

The major difference to FIG. 1 consists of the fact that the channel 7' does not have a continuous course and is angled off in an intersect area 35. In the embodiment depicted here, the channel 7' exhibits two straight line subsections 37, 39. Analogous to the channel 7, depicted in FIG. 1, the subsection 37 empties into the borehole 17 and the subsection 39 empties into the pin 25. The subsections 37, 39 are formed by a first borehole 41 and a second borehole 43, which intersect in the intersect area 35. The first borehole 41 and the second borehole 43 exhibit two other subsections 45 and 47, which are not part of the channel 7'. To seal the channel 7', the subsections 45, 47 are provided with a first locking element 49 and a second locking element 51. The locking elements 49, 51 are indicated here as the threaded rods. Instead of screwing to lock the subsections 45, 47 of the first borehole 41 and the second borehole 43, it is also conceivable to provide a force fit, cementing, soldering, welding or any arbitrary other locking element. It is also possible for the locking elements 49 and 51 to provide materials with a higher or lower specific weight in relation to the collet 2, so that the locking elements 49 and 51 can serve simultaneously as the balancing weights when the collet 2 is out of balance due to the channels 5 and 7'

Figure 3:
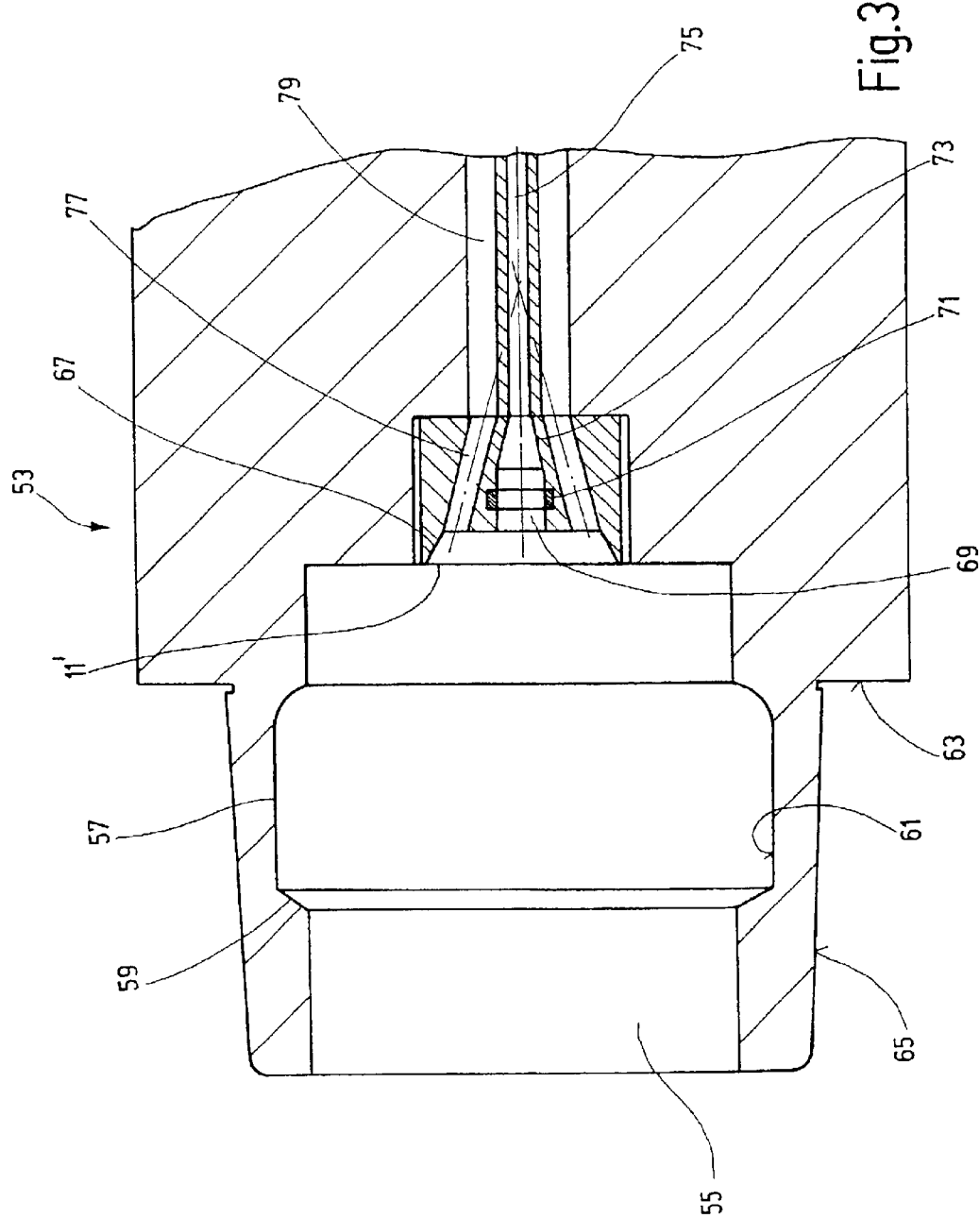
FIG. 3 is a longitudinal view of a part of a tool insert.

FIG. 3 is a longitudinal view of a part of a tool insert 53, namely the hollow shaft cone. It is obvious that there is a borehole 55 with a flute 57, which exhibits a phase 59. The borehole 55 serves to hold the collet 2. The gripping jaws (not illustrated here) of the collet 2 engage with the flute 57 and hold thus the tool insert 53 on a tool spindle. To this end, the gripping jaws are moved radially in the outward direction by means of the right/left screw, which is also not illustrated. In so doing, the gripping jaws rest against the phase 59 and against an internal face 61 of the flute 57.

Axial and radial clamping forces are generated by moving the gripping jaws radially by means of the gripping jaws of the collet 2 (not illustrated here) making contact with the internal surface 61 and the phase 59, serving as the clamping shoulder. A preferably continuous, annular contact face 63 is pressed by means of these clamping forces against a contact face 107', provided on the tool spindle 89, which is not illustrated here (see FIG. 4); and the conical external surface 65 is pressed by means of these clamping forces against the conical internal surface of a receiving opening in the tool spindle. Thus, the tool insert is fixed radially and axially in a defined position by means of the collet 2.

Also evident is an interface area 11', which interacts with the second interface area 11 of the collet 2. The first channel 5 and the second channel 7, 7' are continued over the second interface area 11 and the interface area 11'. In so doing, the second ring groove 15 of the first channel 5 empties into a cone 67 of the interface area 11'. In the assembled state, the cone 67 of the interface area 11' and the pin 25 of the collet 2 form a ring groove, which serves to convey a fluid, which is conveyed in the channel 5 of the collet 2. In the assembled state, the pin 25 of the collet 2 is in the interior of a bore 69, which exhibits a peripheral groove with a sealing element 71 and a phase 73. The phase 73 serves in essence as the abutment for the phase 27 of the pin 25 of the collet 2.

Thus, the channel 7, 7' is continued over the interface area 11, 11' and empties into an internal channel 75 of the tool insert 53. In this case the pin 25 of the collet 2 serves only to pass the fluids on, so that the nozzle borehole 31 can be designed with a correspondingly larger diameter. The channel 5 continues after the interface area 11' by way of at least a first channel 77, which empties into a second peripheral channel 79. The internal channel 75 and the separate peripheral channel 79 run concentrically in the axial direction inside the tool insert 53.

The two channel guide, comprising the internal channel 75 and the second peripheral channel 79, empties into a mixing and vorticizing chamber, which is not illustrated here and which is attached expediently as close as logically possible to the actual operating site, thus at the cutting edge of the tool insert 53. Not only lubricants, coolants but also flushing agents can be fed into the channels. It is especially possible in an advantageous manner to convey a liquid medium in the internal channel 75 and a gaseous medium in the second peripheral channel 79. However, there is also the possibility of conveying the liquid medium in the second peripheral channel or of conveying two gaseous or two liquid mediums in the channels.

Figure 4:
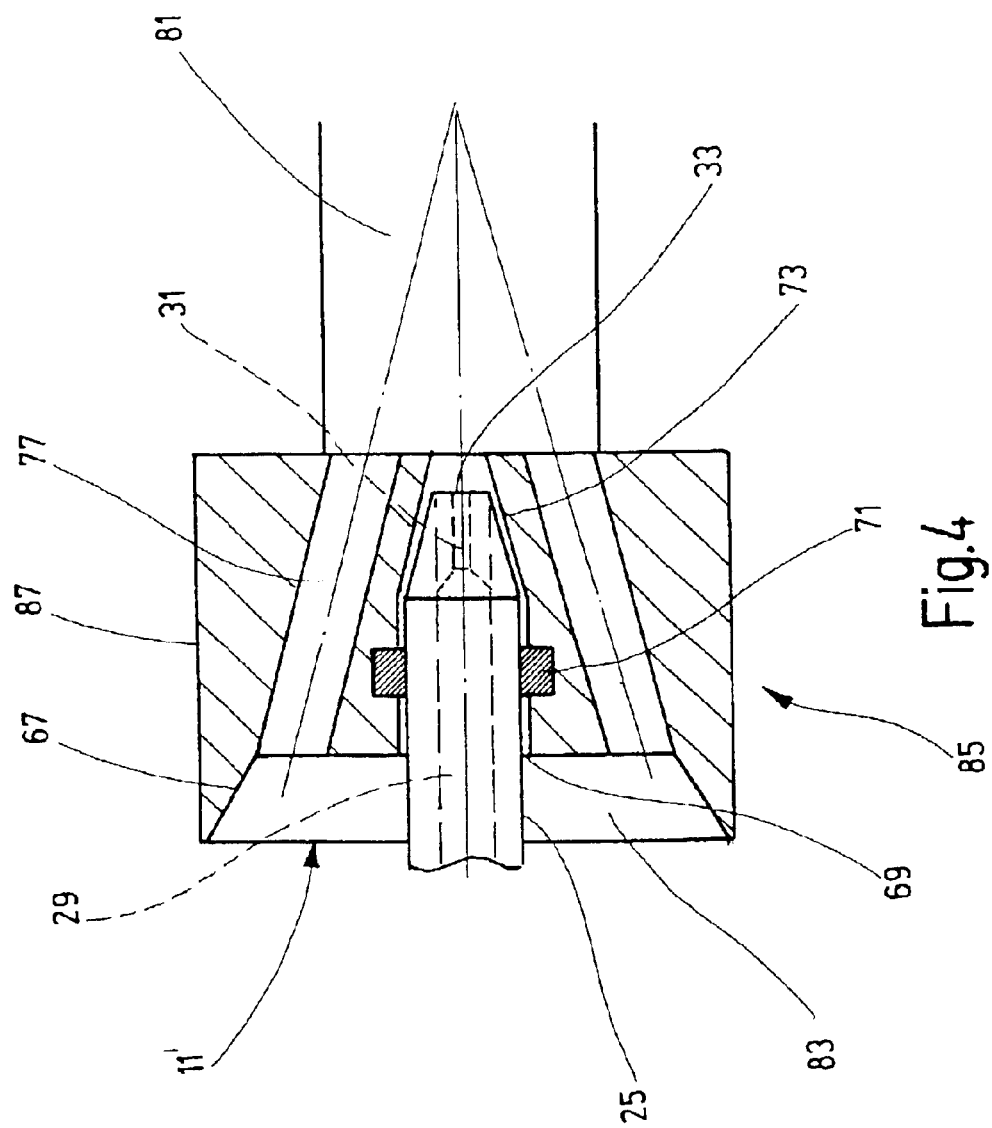
FIG. 4 is a longitudinal view of a mixing device with mixing chamber.

FIG. 4 is an enlarged detail of a mixing device 85 from FIG. 3 with the pin 25 of the collet 2, depicted in FIGS. 1 and 2. Identical parts are provided with the same reference numerals so that in this respect reference is made to the description of the previous figures.

The interface area 11' is depicted here in the assembled state with the pin 25, which, in contrast to FIG. 3, empties into a mixing and vorticizing chamber 81. Evident is the pin 25, which is introduced into the borehole 69 and is sealed by means of the sealing element 71, which is designed, for example, as an O-ring. In this embodiment a liquid medium is conveyed preferably through the channel 7, 7'. Said liquid medium flows through the borehole 29, which tapers into a nozzle bore 31, and through the discharge opening 33 into the mixing and vorticizing chamber 81. A gaseous medium, conveyed through the channel 5, flows through a ring groove 83, formed by the cone 67 and the pin 25, into the first channel 77 and from there finally into the mixing and vorticizing chamber 81. Evident is that the first channel 77 is at an angle to the nozzle borehole 31, a feature that supports an optimal formation of the mixture. The second channel 77 can comprise a number of individual channels, for example, two channels, which are realized, for example, by means of boreholes and run at an acute angle to the center axis of the mixing nut 87 and penetrate the same. It is conceivable to convey the medium in the channel 7, 7' at a high pressure or pulsed high pressure, a state that results in an atomization of the liquid fluid at the discharge opening 33. It is also conceivable to position the discharge opening 33 in such a manner in the volume stream of the gaseous medium that the liquid medium is dragged along by the gaseous medium flowing by-on the basis of the Venturi effect-and thus vorticized.

The liquid mixture, which results in the mixing and vorticizing chamber and which is preferably a mixture of air and oil, serving the minimum volume lubrication, is conveyed over an arbitrary channel (not illustrated here) up to the actual operating site, the cutting edge of the tool insert 53. The mixing device 85 (shown here) can be designed as a mixing nut 87, which is screwed into the tool insert 53, or can be an integral component of the tool 1. In this respect it is irrelevant whether the mixing device 85 with the mixing nut 87 and the mixing and vorticizing chamber 81 is disposed inside the tool insert 53 or inside the collet 2. What is important is that the channels 5 and 7, 7' can be continued beyond the interface areas 9, 11, 11' and that directly at or after the interface area 11, 11' or after a continuation in the tool insert 53 they empty into a mixing device analogous to the mixing device 85, illustrated here, by means of which the liquids are mixed.

Figure 5:
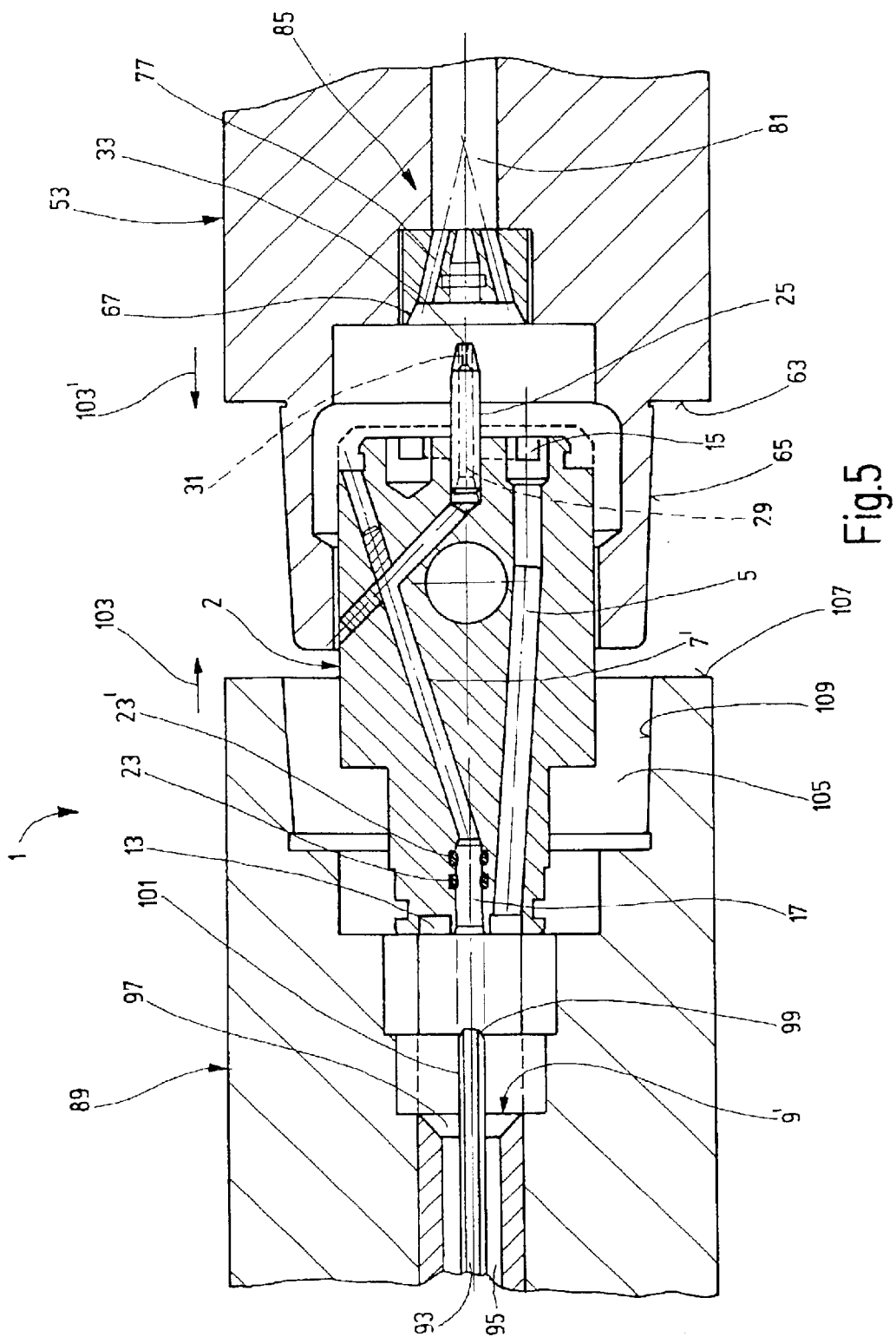
FIG. 5 is a longitudinal view of a tool spindle, a collet and a tool insert in the disassembled state.

FIG. 5 is an exploded drawing of a tool 1 with a tool spindle 89, the collet 2 and the tool insert 53. It shows, as an example, the embodiment of the collet 2, depicted in FIG. 2. Identical parts are provided with the same reference numerals so that in this respect reference is made to the description of the previous figures.

The drawing shows the tool spindle 89 with an internal fluid channel 93 and an external fluid channel 95, which empties into a cone 97. The internal channel 93 is continued over an interface area 9' as a pin 101 with an external phase 99. To assemble the tool 1, the collet 2 is moved opposite the direction of the arrow 103 and fixed in the radial direction on the tool spindle 89, for example, by means of a bayonet connection, which is not illustrated here in detail. Thus, the pin 101 is inserted into the borehole 17 by means of the phase 99 and sealed by means of the sealing elements 23, 23'. The internal channel 93 is continued beyond the interface area 9, 9' and empties into the channel 7'. The tool 1 is further assembled by moving the tool insert 53 in the direction of an arrow 103' and by inserting the hollow shaft cone with the external surface 65 into a conical recess 105 of the tool spindle 89 until a contact face 107 of the tool spindle 89 makes contact with the contact face 63 of the tool insert. Owing to the clamping jaws, which are described in FIG. 3, but not depicted here, radial and axial clamping forces are generated so that the hollow shaft cone expands in the area of the internal surface 61; and a conical internal surface 109 of the tool spindle 89 is brought into contact with the conical external surface 65 of the tool insert 53. Through the clamping forces and the contact faces 107, 63, 109, 65, the tool spindle 89 is connected securely to the tool insert 53 by means of the collet 2 and the bayonet connection.

Evident is the two channel fluid guide, extending through the entire tool 1. In this respect the peripheral channel 95 in the tool spindle 89 continues by way of the cone 97 and the first ring groove 13 into the first channel 5 inside the collet 2. This channel continues by way of the second ring groove 15 and the cone 67 into the first channel 77 of the mixing device 85. Thus, it empties into the mixing and vorticizing chamber 81 of the mixing device 85. If one looks at the embodiment, according to FIG. 3 of the tool insert 53, it is clear that the first channel 5 continues by way of the second ring groove 15 and the cone 67 into the second peripheral channel 79 inside the tool insert 53.

Inside the tool 1 there is also a separate second channel guide, which comprises the internal channel 93 inside the tool spindle 89. It continues by way of the pin 101, which engages with the borehole 17 of the collet 2, into the second channel 7'. In the embodiment, depicted in FIG. 5, the second channel 7' continues by way of the pin 25 up to and into the mixing device 85 in the tool insert 53. Here, too, it is possible that the second channel 7' passes over the pin 25 into the internal channel 75 in the interior of the tool insert 53, which is evident from FIG. 3.

Altogether it is evident that the tool 1 exhibits a separate two channel fluid guide, which is already provided in the tool spindle 89 and extends through the collet 2. Furthermore, it is possible for the separate two channel fluid guide to be also provided in the interior of the tool insert 53, in order to feed different mediums, for example, oil and air, directly up to the actual operating site, namely as far as the cutting edge of a tool.

In the embodiment, illustrated here, a centered pin is provided in the area of the different interfaces. Said pin enables a relative rotation of the parts allocated to the interfaces and also facilitates the assembly of the tool parts.

The tool insert 53, mentioned here, can exhibit on its outside at least one cutting edge or knife plate, thus be designed as a tool head. However, it is also possible that the tool insert is designed as an intermediary piece or extension or adapter. In all cases it is possible to provide a separate two channel fluid guide for longer tools. Thus, even for long tools a separation or sagging can also be prevented, when a so-called minimum quantity lubrication is realized.

The ring groove, provided in the area of the interfaces, does not necessarily have to be designed as continuous. It serves to distribute the fluid quantity, conveyed around the pin, in such a manner that an optimal fluid guide can be realized.

It is clear from the explanations that the tool exhibits two separate fluid channels, which are also provided especially in the area of the collet. Yet it is very small and compact so that even in the case of tools with a small diameter the two channel fluid guide is easily realizable. It is even possible to retrofit existing mechanically lockable collets with a second fluid channel, in order to provide a separate fluid guide for a minimum quantity lubrication. Preferably, on the one hand, compressed air and, on the other hand, a liquid coolant/ lubricant are conveyed through the fluid channels in order to realize in particular a minimum quantity lubrication.

A detailed discussion of the process for producing the channel 7', which terminates in the collet 2, will be presented below. In this respect, reference is made to FIG. 2.

The channel 7' is produced in two process steps. In the first step the subchannels are drilled, and in the second step parts of the boreholes are closed again. To produce the channel 7', at least the two boreholes 41, 43, intersecting in the intersect area 35, are introduced into the collet 2. The channel 7' terminates in the subsection 37 of the first borehole 41, branches off into the intersect area 35 and continues in the subsection 39 of the second borehole 43. Following the drilling operation, the channel 7' is opened externally twice at the intersect area 35 of the boreholes 41, 43 by way of the same.

In the second process step these two openings are closed again with locking elements 49, 51 by means of screwing, force fitting, cementing, soldering or welding or any arbitrary locking element. Thus, the result is finally in the interior of the collet 2 the externally sealed channel 7'. The position of the boreholes 41, 43 is chosen preferably in such a manner that the respective end of the boreholes 41, 43 lies on the center axis of the collet 2. Then a continuous channel 7' can be realized by means of two other centered boreholes, which meet the ends of the boreholes 41, 43. In FIG. 2 they are the borehole 17 and a borehole, into which the pin 25 is inserted. The result is a channel 7', which runs in the interior of the collet 2 and which is bent off three fold at the respective intersect points of the boreholes 17, 41, 43 and the borehole into which the pin 25 is inserted, and which is guided around the borehole 3, which serves to hold the tightening screw for the gripping jaws.

It is also possible to produce two separate channels in the interior of the collet 2 by way of a sintering process. It has been demonstrated that finally two separate channels, by means of which a gaseous and a liquid medium can be conveyed up to the vicinity of the actual operating site, namely up to the cutting edge of a tool, can also be realized in a simple manner. In this respect the cost of production can be ignored so that the cost for the tool can be minimized. Furthermore, the assembly of the tool remains simple and unsusceptible to malfunctions.

What is claimed is:

1. A tool with a tool insert for machining workpieces, comprising:
   a collet configured for manual interchange of tools and for securing in position a tool insert in a tool spindle, said collet further comprising:
   a first interface having a contact surface for contacting a tool spindle;
   a second interface having a contact surface for positioning against a tool insert;
   a central axis extending between said first interface and said second interface;
   a first ring groove formed in said contact surface of said first interface for receiving fluid from the tool spindle;

a second ring groove formed in said contact surface of said second interface;

a first channel for conveying at least one fluid from the group consisting of coolants, flushing agents and lubricants, said first channel extending essentially in an axial direction; and a second channel separated from said first channel and extending essentially in an axial direction for conveying at least one fluid from the group consisting of coolants, flushing agents and lubricants;

an axially centered borehole formed in said first interface, central to said first ring groove, for conveying fluid to one of said first channel or said second channel; and a mixing device disposed to receive fluids from said first and second channels.

2. The tool according to claim 1, further comprising a fluid-conveying pin extending from one of said first channel or said second channel at said second interface.

3. The tool according to claim 2, wherein said second channel extends from said axially centered borehole to said pin to convey fluid therebetween.

4. The tool according to claim 3, wherein said first channel extends from said first ring groove to said second ring groove to convey fluid therebetween.

5. The tool according to claim 2, wherein said mixing device comprises a mixing nut, positioned adjacent said second interface, and having groove for receiving fluid from said second ring groove, a nozzle and a bore sized to receive and fluid-conveying pin.

6. The tool according to claim 2, wherein said mixing device is formed in a tool insert secured to said collect, said mixing device having a mixing and vorticizing chamber and a nozzle for receiving said pin.

7. The tool according to claim 2 wherein said second channel is formed by two boreholes which are oriented at an angle relative to each other.

8. The tool according to claim 3 wherein said second channel is formed from two boreholes oriented at an angle to each other.

9. A tool system including the tool with tool insert according to claim 2, and further comprising the tool spindle, the tool spindle being configured with a centered pin positioned for receipt in said axially centered borehole.

10. The tool according to claim 1, wherein said second channel is non-linear from said first interface to said second interface.

11. The tool according to claim 1 wherein said second channel is formed by two boreholes which are oriented at an angle relative to each other.

12. The tool according to claim 1 wherein said mixing device comprises a mixing and vorticizing chamber positioned to receive fluids from said first and second channels.

13. The tool according to claim 1, wherein said mixing device is formed with said collet at said second interface and comprises a nozzle.

14. A tool system including the tool with tool insert according to claim 1, and further comprising the tool spindle, the tool spindle being configured with a centered pin positioned for receipt in said axially centered borehole central to said first ring groove.

15. The tool system according to claim 14, wherein said second channel is in fluid communication with said centered pin of said tool spindle.

16. The tool according to claim 1, further comprising a radially extending borehole positioned through said collect to receive an actuator for a radial clamping mechanism.

17. A collect configured for manual interchange of tools and for securing in position a tool insert in a tool spindle, comprising:

a collet body having a central axis;

a first interface having a contact surface for contacting the tool spindle;

a second interface having a contact surface for positioning against the tool insert; the central axis extending between the first and second interfaces a first ring groove formed in said contact surface of said first interface for receiving fluid from the tool spindle;

a second ring groove formed in the contact surface of the second interface;

a first channel extending essentially in an axial direction for conveying at least one fluid from the group consisting of coolants, flushing agents and lubricants;

a second channel, separated from said first channel and extending essentially in an axial direction for conveying at least one fluid from the group consisting of coolants, flushing agents and lubricants;

an axially centered borehole formed in said first interface, central to said first ring groove, for conveying fluid to on of said first channel or said second channel;

a mixing device disposed to receive fluids from said first and second channels;

and a radial borehole positioned through said collet body for receiving an actuator for a radial clamping mechanism.

18. The collet according to claim 17, further comprising a mixing chamber positioned to receive fluids from said first and second channels.

19. The collet according to claim 18, further comprising a fluid-conveying pin extending from said collet body in fluid communication with one of said first and second channels.

20. The tool according to claim 17, wherein said second channel is non-linear.

21. The tool according to claim 17 wherein said second channel is formed by two boreholes which are oriented at an angle relative to each other.

* * * * *